No. 773,612. PATENTED NOV. 1, 1904.
T. L. WALLACE & J. A. REED.
SAW TOOTH SHARPENER.
APPLICATION FILED AUG. 8, 1903.
NO MODEL. 7 SHEETS—SHEET 1.
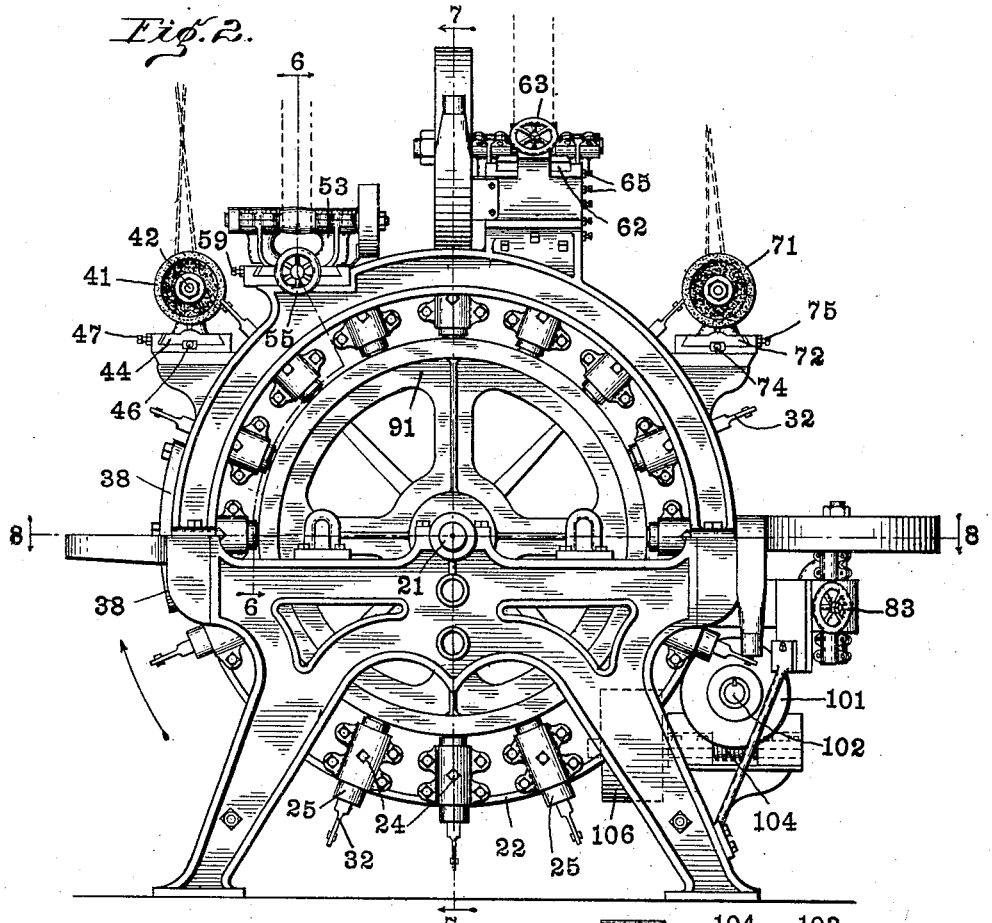
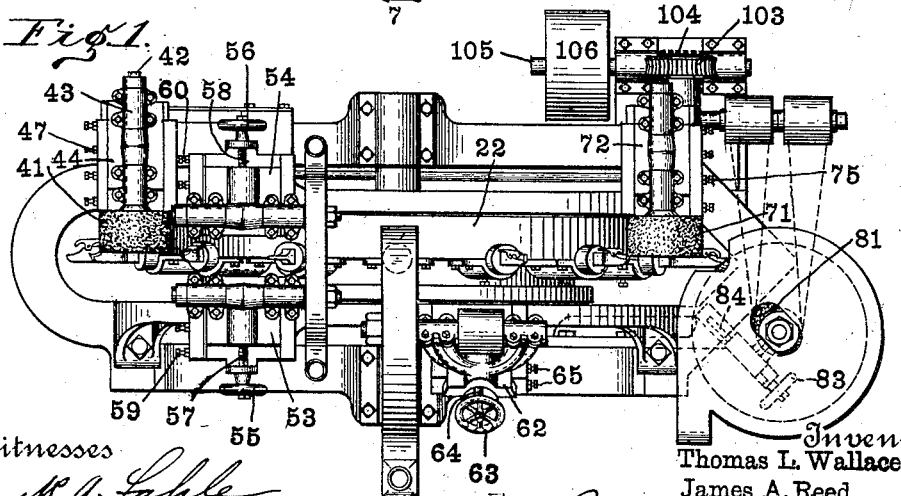
Inventors
Thomas L. Wallace and
James A. Reed No. 775,612. PATENTED NOV. 1, 1904.
T. L. WALLACE & J. A. REED.
SAW TOOTH SHARPENER.
APPLICATION FILED AUG. 8, 1903.
NO MODEL. 7 SHEETS—SHEET 2.

Witnesses
Frank A. Fahle
J. A. Walsh.

Inventors
Thomas L. Wallace and
James A. Reed
by Bradford V. Hood,
Attorneys

No. 773,612. PATENTED NOV. 1, 1904.
T. L. WALLACE & J. A. REED.
SAW TOOTH SHARPENER.
APPLICATION FILED AUG. 8, 1903.
NO MODEL. 7 SHEETS—SHEET 3.
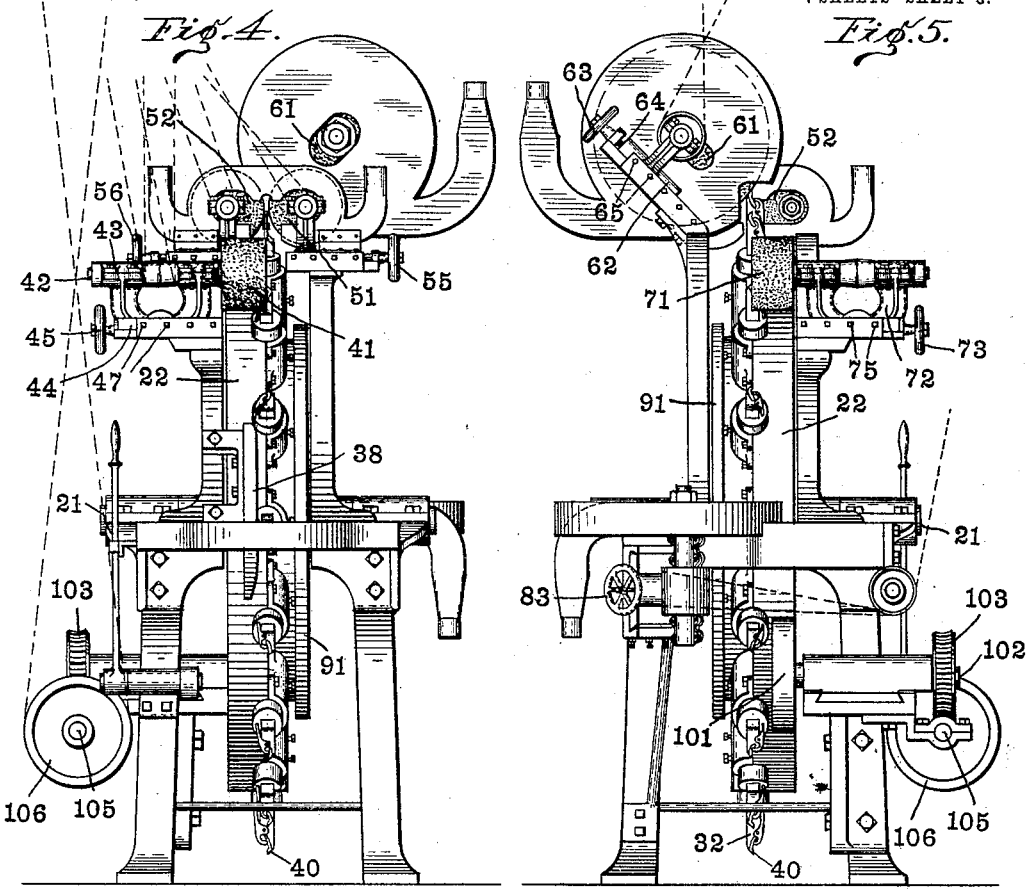
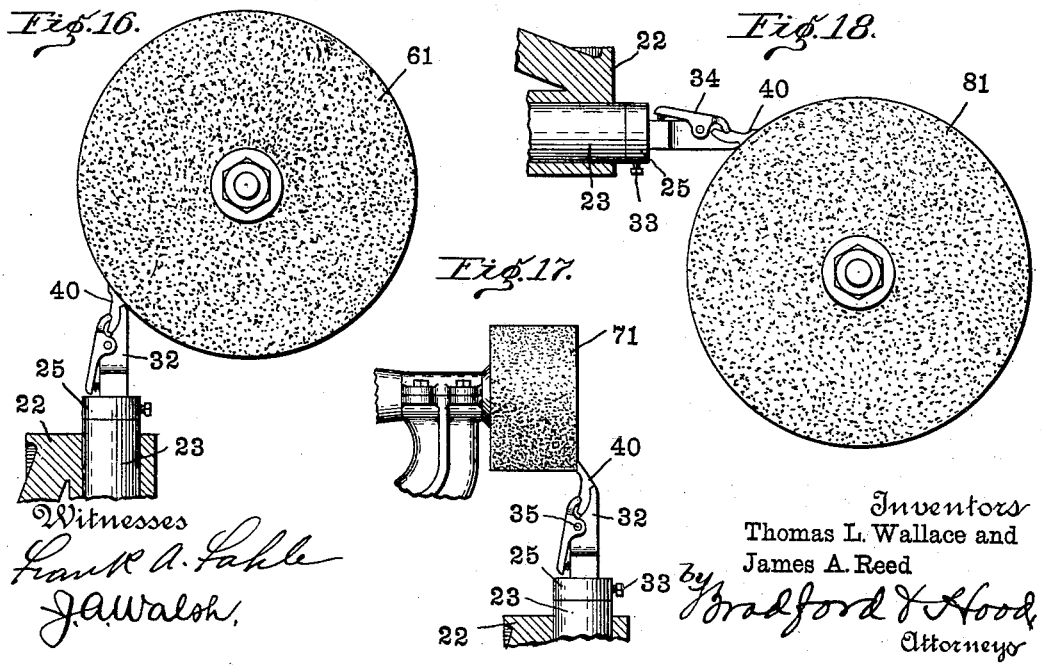
Witnesses
Frank A. Fahle
J. A. Walsh
Inventors
Thomas L. Wallace and
James A. Reed
by Bradford & Hood
Attorneys

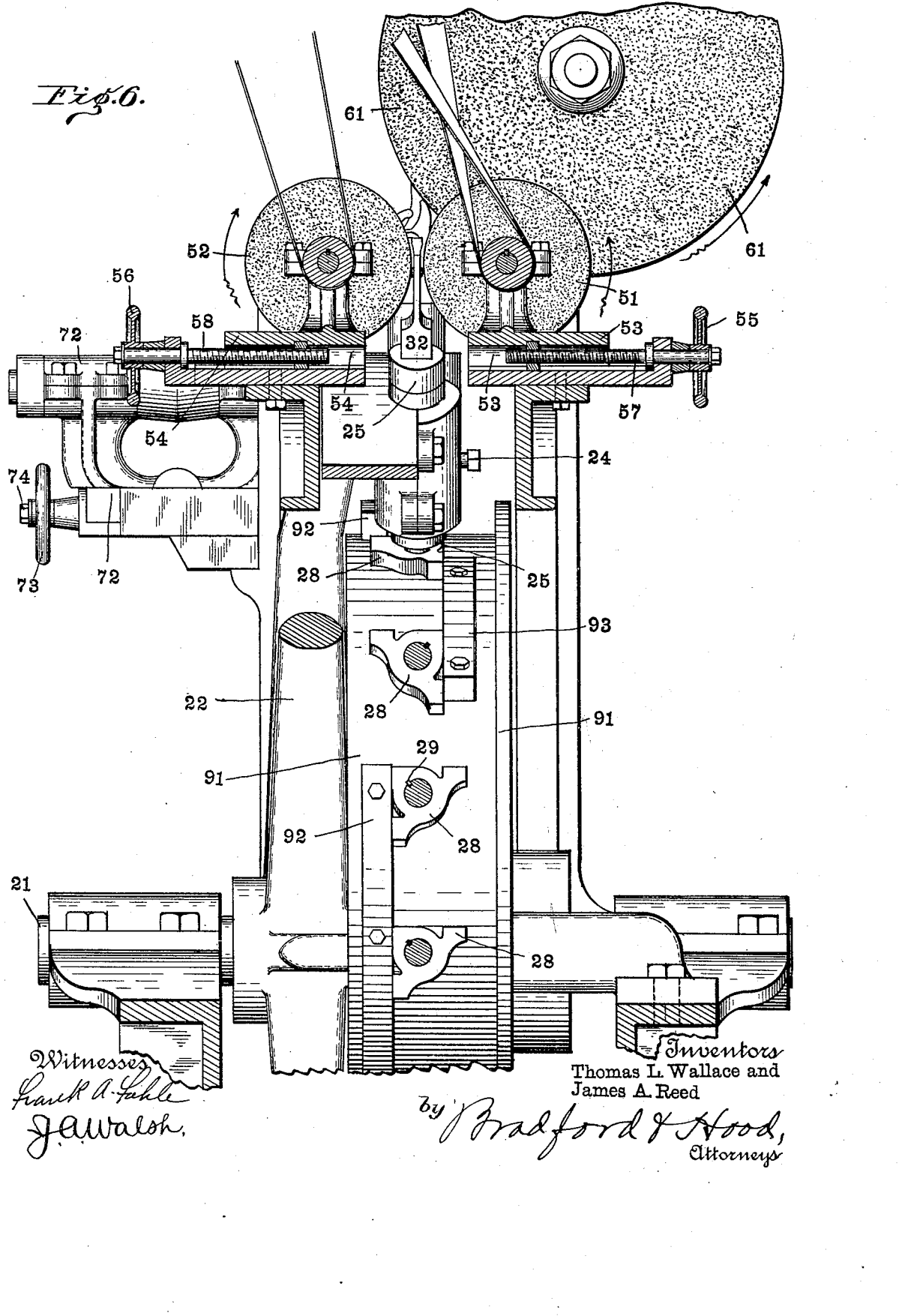

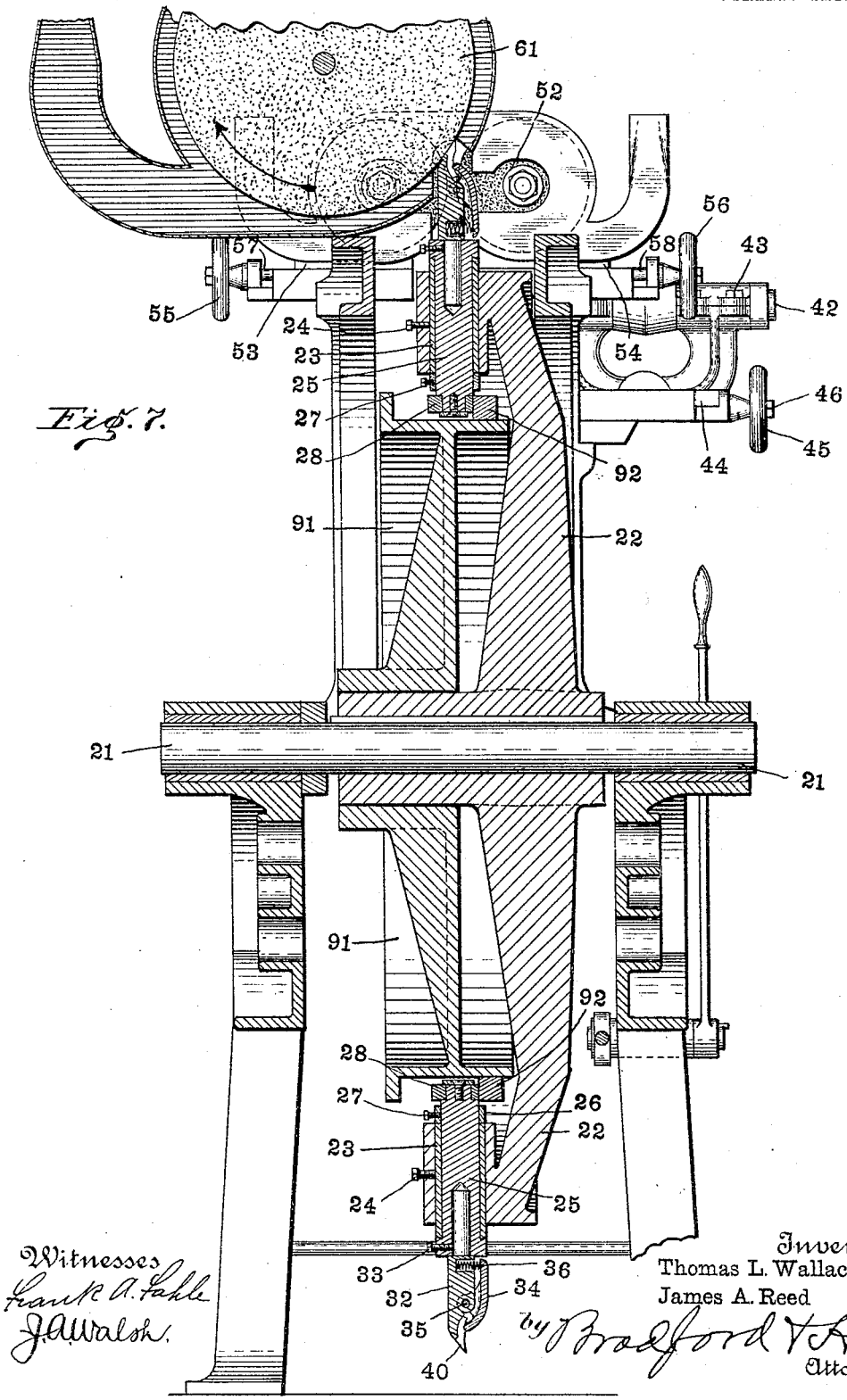

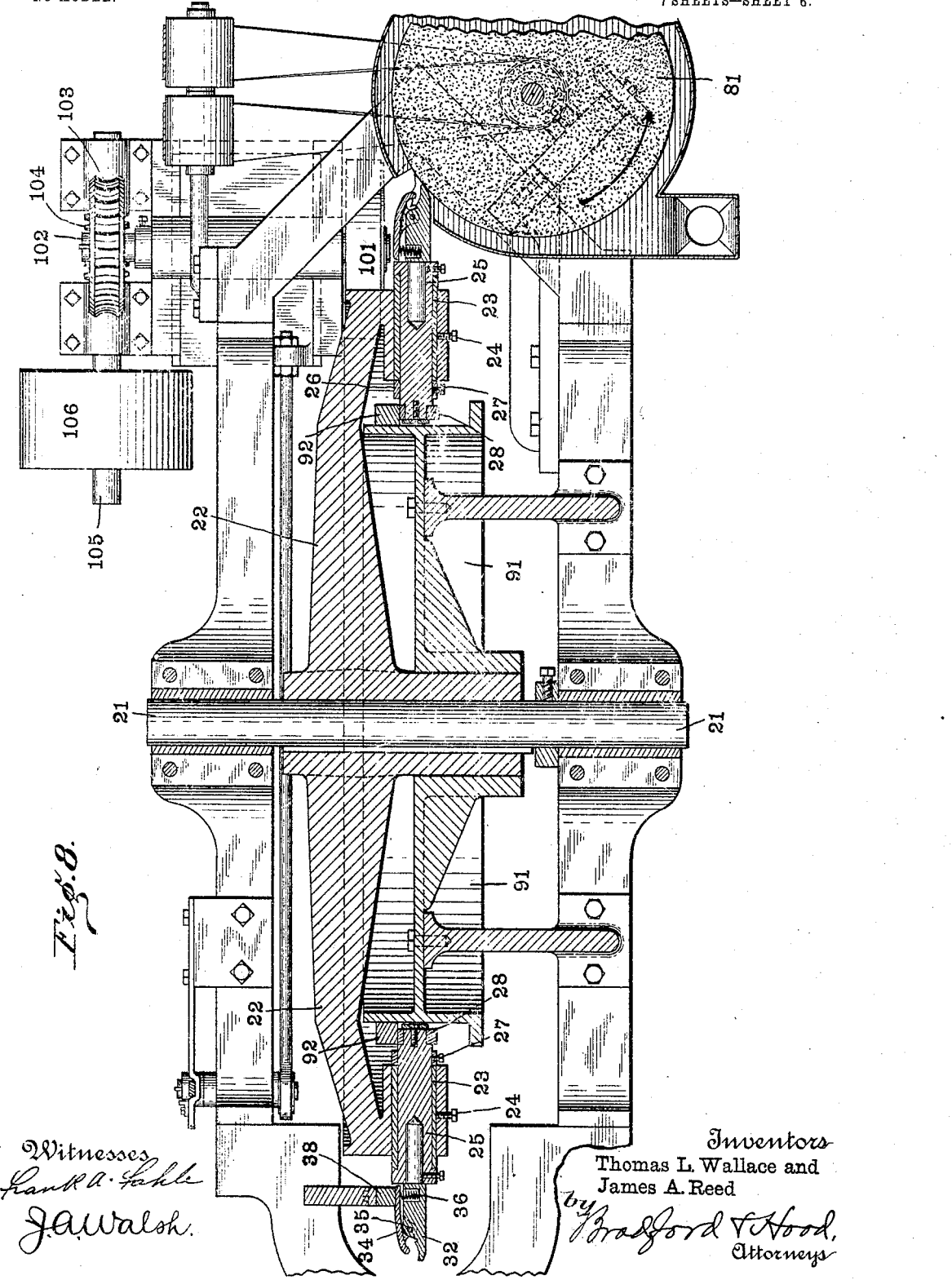

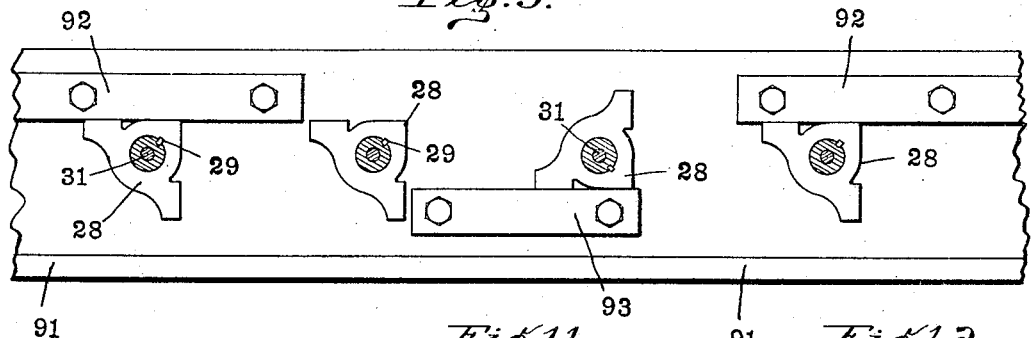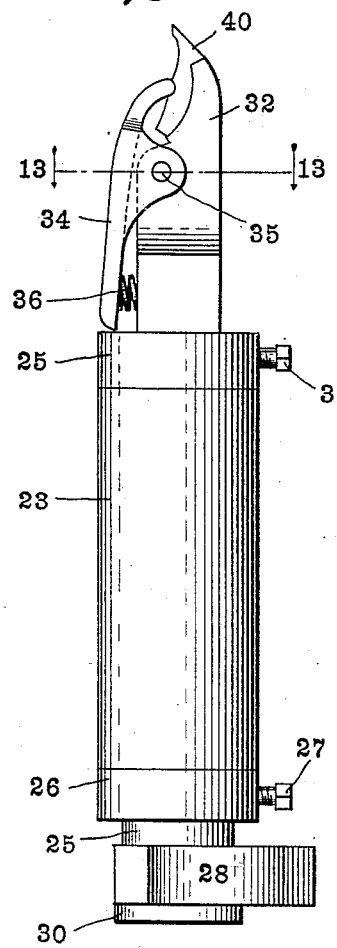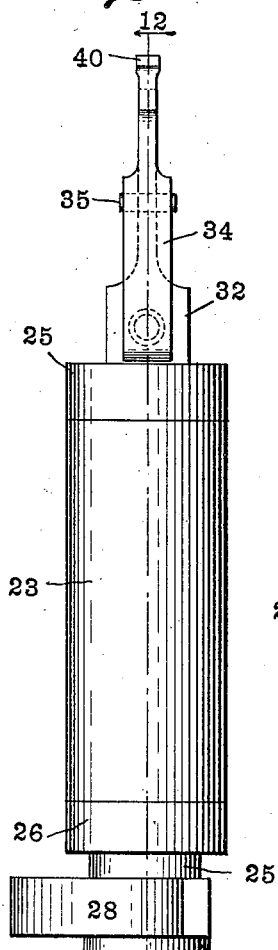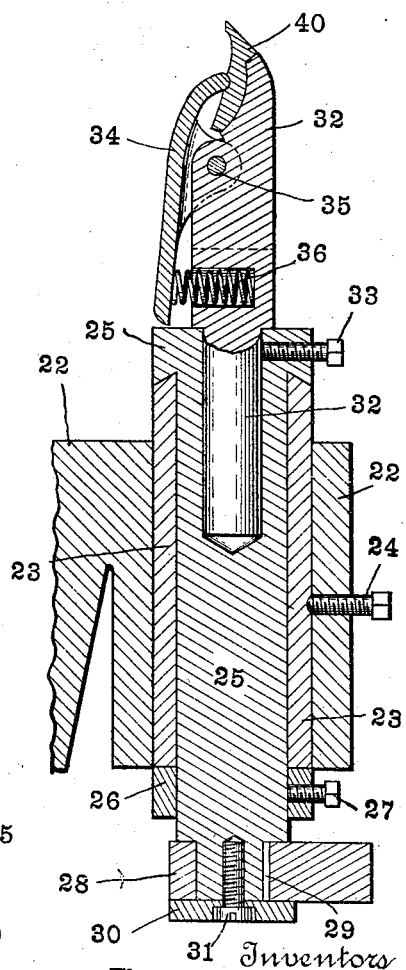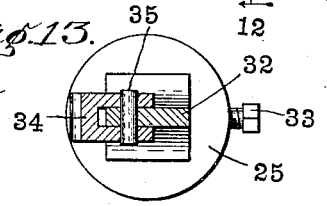

No. 773,612.

Patented November 1, 1904.

UNITED STATES PATENT OFFICE.

THOMAS L. WALLACE AND JAMES A. REED, OF INDIANAPOLIS, INDIANA, ASSIGNORS TO E. C. ATKINS & COMPANY, OF INDIANAPOLIS, INDIANA, A CORPORATION OF INDIANA.

SAW-TOOTH SHARPENER.

SPECIFICATION forming part of Letters Patent No. 773,612, dated November 1, 1904.

Application filed August 8, 1903. Serial No. 168,806. (No model.)

*To all whom it may concern:*

Be it known that we, THOMAS L. WALLACE and JAMES A. REED, citizens of the United States, residing at Indianapolis, in the county of Marion and State of Indiana, have invented certain new and useful Improvements in Saw-Tooth Sharpeners, of which the following is a specification.

In the manufacture of inserted-tooth saws one of the most tedious and difficult operations is the shaping and sharpening of the cutting-edges of the bits or chisel-points of the teeth, which is commonly done either by filing or by grinding. In grinding operations as heretofore conducted such bits or tooth-points have been held against the grinder by hand and ground singly, and in either the grinding or filing operations it has been very difficult to secure that measure of accuracy and uniformity which is required for the best results, while the work (at best) has been slow and tedious.

The object of our said invention is to produce a machine which will hold such bits or tooth-points properly and present them to the grinding-surfaces in such a manner as to secure accuracy and uniformity and at the same time perform the work at a considerably greater speed than is possible when the work is done by hand. To this end we have constructed a machine embodying a multiplicity of grinders and containing a revolving structure bearing a multiplicity of bit-holders which will hold and carry the bits and so present them to the grinding-surfaces that the desired surfaces will be rapidly and accurately formed and sharpened. The bit-holders carrying the bits are capable of being shifted revolubly at proper points in order that the various sides of the bits shall come in contact with these grinders, which are especially designed to operate thereon.

Figure 3:
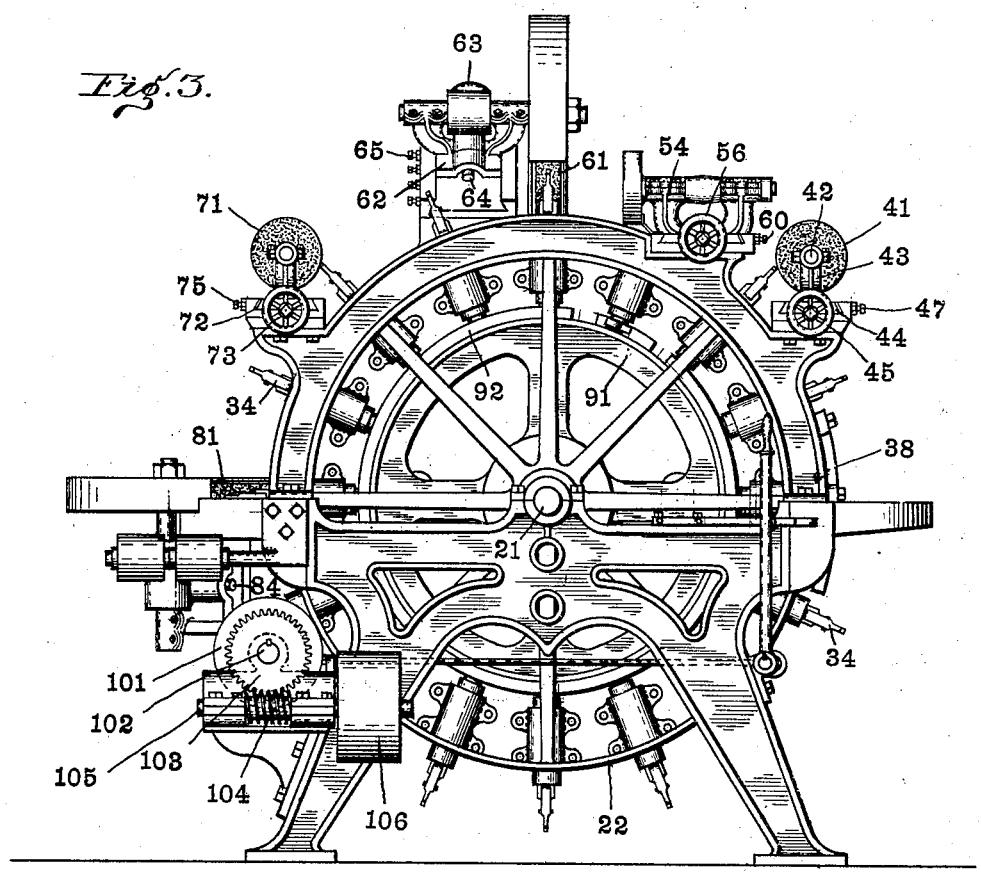
Figure 14:
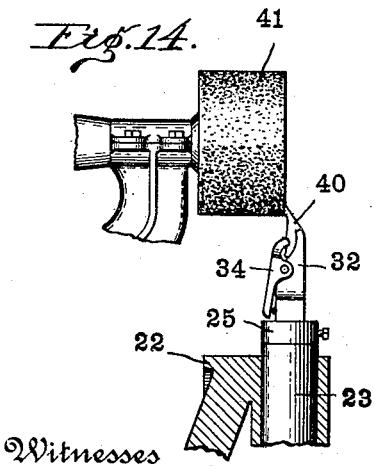
Figure 15:
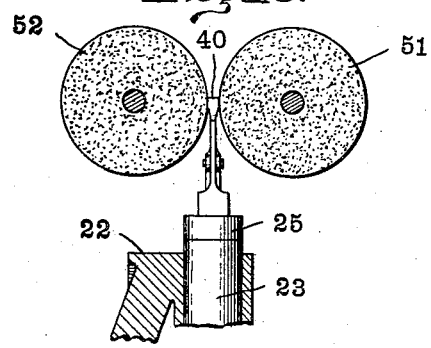

Referring to the accompanying drawings, which are made a part hereof, and in which similar reference characters indicate similar parts, Figure 1 is a top or plan view of a machine embodying our said invention; Fig. 2, a side elevation thereof, showing the right-hand side; Fig. 3, a side elevation showing the left-hand side; Fig. 4, a front elevation thereof; Fig. 5, a rear elevation; Fig. 6, a view, on an enlarged scale, showing parts in section and parts in front elevation as seen from the dotted line 6 6 in Fig. 2; Fig. 7, a central transverse vertical sectional view as seen when looking in the direction indicated by the arrows from the dotted lines 7 7 in Fig. 2; Fig. 8, a horizontal sectional view as seen when looking downwardly from the dotted line 8 8 in Fig. 2; Fig. 9, a plan view of a fragment of the bit-holder-operating rim, illustrating the means by which the bit-holders are revolved to throw various operative positions and there held; Figs. 10 and 11, side and front elevations of one of the bit-holders separately; Fig. 12, a central vertical sectional view on the dotted line 12 12 in Fig. 11 and also showing a fragment of the bit-holder-carrying wheel; Fig. 13, a horizontal sectional view looking downwardly from the dotted lines 13 13 in Fig. 10; and Figs. 14, 15, 16, 17, and 18, fragmentary views showing the exact relation of a bit to each of the grinding-wheels at the instant of the respective grinding operations, together with a sufficient fragment of the bit-holder in each case to clearly show the relations of the respective parts.

In describing the figures of drawings and in making reference thereto hereinafter in the specification we consider the end of the machine shown at the left hand in Fig. 2 as the front of the machine and those sides which are at the right and left of the operator when standing at the front and facing the machine the right and left hand sides of said machine, respectively.

Upon a central shaft 21 we mount a wheel or rotary structure 22, containing in its rim bearings for a multiplicity of bit-holders. These bearings are preferably in the form of sleeves 23 and are adjustably held in place by set-screws 24, as perhaps best shown in Figs. 7 and 12. Each bit-holder includes a stem 25, which is held into a sleeve 23 by a set-collar 26 (secured by set-screw 27) and bears upon its lower end a cam 28, which is secured thereon by a combination of spline 29, cap-plate 30, and screw 31, as best shown in Fig. 12. Within the upper end of the stem 25 is a longitudinal perforation or socket into which the lower end of the main bit-holding jaw 32 extends and which is held therein by means of a set-screw 33. By this means the bit-holding jaws may be very accurately adjusted, so as to bring the bits into the precise relation to the grinders which is necessary for the purpose. The smaller bit-holding jaw 34 is secured to the main jaw 32 by pivot 35 and is operated to grip the bit when inserted therein by the action of spring 36, which is mounted in a socket provided for the purpose in the main jaw 32 and presses outwardly against the lower lever-like end of jaw 34. These bit-holding jaws are formed at their operative ends to just fit the small bits or cutting-tooth points and hold them firmly while being treated. These bits 40 are or may be of any ordinary or desired form. As above stated, there are a multiplicity of these bit-holders carried by the wheel or structure 22, and as they respectively pass the several grinding-points they are adapted to be manipulated by the various operating means provided. As also above stated, the point at the left in Figs. 2 and 8 is considered the front of the machine, and the operative stands near this point. As the bit-holders pass to just above the frame at this point the pivoted jaw 34 comes in contact with a strike 38, carried by the framework, which operates to swing the gripping end of this jaw outwardly, releasing the bit which has until that time been held by said jaws and permitting it to fall into such receptacle as may be provided. As soon as this happens the operative inserts an unground bit, and as the bit-holder passes on the jaw 34 escapes from the strike 38 and under the impulse of the spring 36 grips the bit which has just been inserted therein. It is then carried along, and the bit is presented to the first grinder 41, by means of which the major portion of the desired grinding is done on the surface which comes in contact with said grinder. While this portion of the grinding is being done, the bit, the holder, and the grinding-wheel are severally in the relative positions indicated in Fig. 14. As the wheel 22 advances it carries the bit next into contact with the pair of grinders 51 and 52. The bit while being ground by these is in the relative position to the adjacent parts indicated by Fig. 15. As the wheel 22 continues it next carries the bit into contact with the grinder 61. At the time the grinding is being done at this point the bit and adjacent parts are severally in the relative positions indicated by Fig. 16. The bit is next carried past the grinder 71, at which time it and the adjacent parts are severally in the relative positions indicated by Fig. 17. Finally, the bit is carried past the grinder 81, and at this time the several parts are in the relative positions indicated by Fig. 18. These five grindings complete the grinding operation and leave the bit in exactly the form desired. The several grinders, as will be presently described, are adjustable sufficiently and accurately enough to produce this result. After the bit leaves the grinder 81 it is simply carried forward by the holder in which it is mounted until the front of the machine is reached and the jaw 34 comes in contact with the strike 38, which, as stated at the beginning, operates to release the bit and discharge it from the machine. As the bit passes the several grinders it is necessary that it be automatically turned to present its different faces to the different grinders in order that the several necessary grinding operations may be accurately accomplished. It is necessary also that the bit-holders as a whole should be held from revolving or relative shifting of position except at the times required. Referring now especially to Figs. 6 and 9, it will be seen that the cams 28, which are rigidly mounted upon the lower ends of the stems 25 of the bit-holders, are adapted to travel in contact with guides carried by the fixedly-mounted rim 91. One of these guides, 92, extends entirely around this rim 91 except for a short distance, as is plainly indicated in said Figs. 6 and 9 of the drawings. Opposite the middle portion of the space left between the ends of the guide 92 is a short guide 93. The cams 28 are of such form that they are substantially continuously in contact with one or the other of these guides. While passing along in contact with the guide 92 they are held so as to present the back and front of the bit to the grinders which they pass during the time they are thus held, and while passing the guide 93 they are turned to and held in a position which brings the edges or sides of the bits into position to be operated upon by the grinders 51 and 52. This operation will perhaps best be understood by an examination of Fig. 9, wherein, assuming the direction of motion to be from left to right, one of the cams is shown as just having escaped from the left-hand portion of guide 92 and just about to come into contact with the end of guide 93. When such contact takes place, the cam is shifted from the position indicated at the left of guide 93 to that indicated above and near the right of said guide, in which position it is held until it has passed said guide 93, during which time the grinding performed by the grinders 51 and 52 takes place. The cam then comes in contact with the end of the right-hand portion of guide 92, which turns it back to the former position, which latter position is maintained during the remainder of the travel.

The grinder 41 is mounted on a shaft 42, which shaft is carried by suitable bearings 43 and which bearings are on a slide 44, which is adapted to be adjustably manipulated by means of a hand-wheel 45 and operating-screw 46. When the exact adjustment desired is reached, the slide, and consequently the grinder, can be clamped rigidly to position by means of set-screws 47. Likewise grinders 51 and 52 are carried by slides 53 and 54 and are manipulated by hand-wheels 55 and 56 and screws 57 and 58 and are adapted to be clamped to adjusted position by set-screws 59 and 60. Likewise grinder 61 is carried on slide 62 and is manipulated by hand-wheel 63 and screw 64 and is adapted to be clamped to adjusted position by set-screw 65. The slide 61 is shown as set at an incline, as this grinder should be adjustable on an angle to the work. Likewise grinder 71 is mounted on slide 72 and adjustable by means of hand-wheel 73 and screw 74 and is held to adjusted position by set-screws 75. The grinder 81 is also capable of similar manipulation by means of the hand-wheel 83 and screw 84. In this case the slide 82 is mounted in horizontal bearings, but at an inclination to the work, as is indicated by the dotted lines in Figs. 1 and 8.

The several grinders are driven by belts coming from a single counter-shaft, (not shown,) the positions of the respective belts being indicated by means of dotted lines. As the wheel 22, carrying the bit-holders, should have a comparatively slow speed, this is effectuated by means of a friction-wheel 101 on a counter-shaft 102, which also carries a worm-gear 103, which is driven by a worm 104 on a driving-shaft 105, which in turn is driven by a belt from the main machine counter-shaft (not shown) running to the pulley 106 thereon.

Having thus fully described our said invention, what we claim as new, and desire to secure by Letters Patent, is—

1. The combination of a rotary structure carrying a multiplicity of holders for receiving and carrying the articles to be ground, three or more grinders arranged in the path thereof, and two of said grinders arranged in a pair upon opposite sides of the path of movement of the holders whereby the article will be simultaneously ground thereby upon opposite sides, means for accurately adjusting the same whereby the successive grinding operations are caused to be accurately performed, and means for operating the holders and causing them to present the various sides of the article to be ground to the grinders as they successively reach the proper points in their travel.

2. The combination of a suitable framework, a rotary structure mounted thereon, a multiplicity of holders carried by said rotary structure each embodying gripping-jaws for holding the articles to be ground, and a strike carried by the framework and positioned alongside the path of the holders and adapted to operate upon one gripping-jaw and thus open the holder and hold it open for the discharge of the finished article and the reception of an unfinished article at the proper period in the revolution of said structure, and grinders arranged adjacent to the path of said holders in position to operate upon the articles therein as the holders pass the grinders.

3. The combination of a suitable framework, a rotary structure mounted thereon, a multiplicity of holders carried by said rotary structure, grinders adjacent to the path of said holders for grinding the articles carried thereby, a rim also arranged adjacent to said holders and embodying guideways on its face, said holders being provided with controlling-cams therefor which come in contact with said guideways whereby said holders are rotated at proper points between the several grinders and the different sides of the articles carried by said holders thus turned to the grinding-faces automatically.

4. The combination of a rotary structure, a multiplicity of radially-disposed holders revolubly mounted therein, controlling-cams secured to said holders, a circular rim fixedly mounted near said cams, and guides on said rim arranged to control the positions of said holders and to shift said positions at the proper points during the travel thereof.

5. The combination of a rotary structure, 22, carrying a multiplicity of holders, movable gripping-jaws carried by said holders, grinders arranged adjacent to the path thereof, controlling-cams on the stems of said holders, and guides 92 and 93 arranged to control the positions of the holders through said cams as the structure carrying said holders revolves.

6. The combination of a rotary structure carrying a multiplicity of holders radially arranged and capable of revolution around their own axes, means for adjusting said holders radially, and means for adjusting and intermittently holding said holders revolubly.

7. The combination of a revoluble structure 22, adjustable sleeve-bearings 23 therein, a holder-stem 25 mounted in said bearings, a main jaw 32 adjustably mounted in said stem, a pivoted jaw 34 mounted on the jaw 32, and a spring 36 interposed between said jaws for causing the gripping thereof on the article being held.

8. The combination of a revoluble wheel, a multiplicity of holders carried by said wheel, a series of roughing-grinders arranged about said wheel in the path of movement of the holders, means for adjusting said grinders, a second series of finishing-grinders similarly arranged in the subsequent path of movement of the rough-ground articles, means for adjusting said finishing-grinders, means for moving the holders successively between the grinders to present the several faces of the article to be ground first to the roughing-grinders and finally to the finishing-grinders, and means for automatically releasing the finished article.

In witness whereof we have hereunto set our hands and seals, at Indianapolis, Indiana, this 31st day of July, A. D. 1903.

THOS. L. WALLACE. [L. S.]
JAMES A. REED. [L. S.]

Witnesses:
CHESTER BRADFORD,
JAMES A. WALSH.